A. GRALA.
POTATO DIGGER.
APPLICATION FILED MAY 7, 1904.

925,331.

Patented June 15, 1909.

Witnesses
J. L. Wright
D. W. Gould

Inventor
Albert Grala,
By Victor J. Evans,
Attorney

UNITED STATES PATENT OFFICE.

ALBERT GRALA, OF MARTINSDALE, MONTANA.

POTATO-DIGGER.

No. 925,331.     Specification of Letters Patent.     Patented June 15, 1909.

Application filed May 7, 1904. Serial No. 206,832.

*To all whom it may concern:*

Be it known that I, ALBERT GRALA, a citizen of the United States, residing at Martinsdale, in the county of Meagher and State of Montana, have invented certain new and useful Improvements in Potato-Diggers, of which the following is a specification.

The invention relates to an improvement in potato diggers of that type in which potatoes are dug and actively separated from the dirt and other refuse during their travel lengthwise of the machine.

The main object of the present invention is the provision of simple means whereby the potatoes may be effectively separated from the weeds, grass, and other large refuse subsequent to their shaking to separate the dirt, whereby the potatoes may be delivered in a comparatively cleanly condition from the delivery end of the apparatus.

The invention will be described in the following specification, reference being had particularly to the accompanying drawings, in which:—

Figure 1:
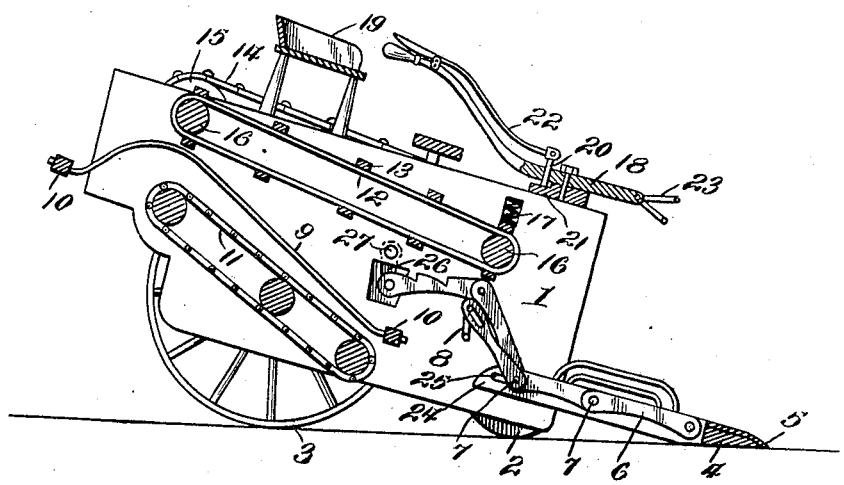
Figure 2:
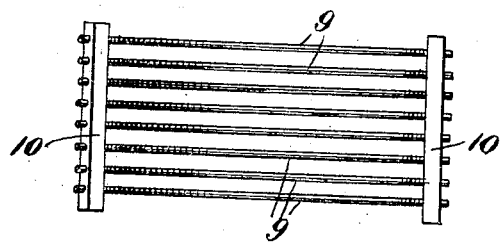

Figure 1 is a view in vertical section, illustrating the improved potato digger. Fig. 2 is a plan of the weed catcher.

Referring particularly to the accompanying drawings, my improved potato digger comprises a framework 1 suitably mounted on front and rear ground wheels 2 and 3. Arranged in advance of the forward end of the frame is a digging share 4 having the usual point 5. Immediately in rear of the digging point is a shaker 6, consisting of a series of links pivotally connected by rods 7, the links being so arranged that the shaker forms a continuation of the share. The rear end of the shaker is connected to a transverse rod having cranked ends 8 adjacent its connection with the frame, whereby in the operation of the rod the shaker is agitated. As the potatoes pass rearwardly from the share onto the shaker all dirt and small refuse is effectively separated from the potatoes, as will be obvious.

Immediately in rear of the shaker there are arranged the forward ends of a series of rods 9 forming what I term a weed catcher. The rods extend longitudinally of the machine in spaced parallel relation and are connected at their forward and rear ends by cross strips 10, whereby to maintain said rods in desired relative position. Underlying the weed catcher is an endless belt or conveyer 11 designed to receive the potatoes falling between the bars of the weed catcher. It is to be particularly noted that the bars 9 are arranged at a relatively divergent angle with respect to the upper plane of the conveying belt. It is to be particularly noted that the weed catcher at its rear end extends beyond the end of the conveyer belt and throughout the length beyond said conveyer belt is downwardly curved so as to deliver the refuse in rear and wholly beyond said belt.

Arranged above the weed catcher is what I term a feed belt 12, having a series of transverse strips 13 designed to engage and force the mass longitudinally of the weed catcher with the effect to permit the potatoes to fall between the bars 9 and onto the conveyer belt for delivery to any suitable receptacle. The feed belt is operated by sprocket chains 14 driving sprocket wheels 15 mounted upon the drums 16 over which said feed belt operates, the relatively forward drum being preferably mounted in yieldable bearings including a spring 17, whereby to permit yielding of said feed belt relative to the weed catcher and preventing breaking of the parts if refuse of unusual size is attempted to be passed through the apparatus.

A shifting lever 18 is mounted on the forward end of the frame, the handle end of which extends within convenient reach of the driver seat 19. The position is controlled by a pin 20 passed through the lever and designed to engage any one of a series of openings formed in the main cross beam 21 of the frame, said pin being operated by a pivoted lever 22. The forward end of the lever 18 carries clevises 23, whereby the tongue may be connected.

A lug 24 is connected to the share and formed at its rear end with a slot 25 in which the rear cross bar 7 of the shaker is adapted for movement. The rear end of the shaker is supported in oscillating hangers 26, which are mounted in recesses in the frame and supported by journals 27.

From the above description it will be apparent that the potatoes dug by the share 4 are delivered onto the shaker so as to eliminate the dirt and small refuse and from the shaker onto the weed catcher. The feed belt operates to force the mass longitudinally of the weed catcher with the effect to permit the potatoes to drop through said catcher onto the conveyer belt 11 in a cleanly condition for delivery from the rear of said belt, the refuse retained by the catcher being forced longitudinally of the same and off the rear end for discharge.

Having now fully described my invention, what I claim as new and desire to protect by Letters-Patent, is:—

1. A potato digger comprising a digging means, an endless belt, a conveyer to carry the potatoes over said belt, and a weed catcher interposed between the conveyer and belt and comprising a series of longitudinally disposed spaced rods arranged at an angle to the plane of the belt and of greater length than the length of the belt.

2. A potato digger comprising a digging means, an endless belt, a conveyer to carry the potatoes over the belt, and a weed catcher interposed between the conveyer and endless belt, the forward end of the conveyer being arranged in advance of the end of the weed catcher, and spring controlled bearings for supporting said forward end of the conveyer.

3. A potato digger comprising a digging means, an endless belt, a conveyer to carry the potatoes over said belt, and a weed catcher interposed between the conveyer and endless belt and comprising a series of longitudinally disposed spaced rods, and cross strips connecting the rods at their ends, the discharge end of said weed catcher curving downward in rear of and terminating below the upper plane of the endless belt.

In testimony whereof I affix my signature in presence of two witnesses.

ALBERT GRALA.

Witnesses:
J. C. MORRIS,
FRANK RUBIN.